(12) United States Patent
Queau et al.

(10) Patent No.: US 10,267,446 B2
(45) Date of Patent: Apr. 23, 2019

(54) PIPE ASSEMBLY COMPRISING A DRAINING SYSTEM

(71) Applicant: Airbus Operations (SAS), Toulouse (FR)

(72) Inventors: Yann Queau, Ramonville Saint Agne (FR); Camille Chaper, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 434 days.

(21) Appl. No.: 14/975,309

(22) Filed: Dec. 18, 2015

(65) Prior Publication Data

US 2016/0178104 A1 Jun. 23, 2016

(30) Foreign Application Priority Data

Dec. 19, 2014 (FR) ...................................... 14 62883

(51) Int. Cl.
*F16L 41/08* (2006.01)
*F16L 55/07* (2006.01)
*B64D 37/00* (2006.01)

(52) U.S. Cl.
CPC .............. *F16L 41/08* (2013.01); *F16L 55/07* (2013.01); *B64D 37/005* (2013.01); *F16L 2201/30* (2013.01)

(58) Field of Classification Search
CPC ....... F16L 41/08; F16L 55/07; F16L 2201/30; B64D 37/005
See application file for complete search history.

(56) References Cited

U.S. PATENT DOCUMENTS

| 4,302,033 | A * | 11/1981 | Evans ................ F16L 27/0816 285/14 |
| 4,362,324 | A * | 12/1982 | Kelly ..................... F16L 27/02 285/119 |
| 6,062,605 | A | 5/2000 | Goshima et al. |
| 6,763,701 | B1 * | 7/2004 | Moretz ................ F16L 37/252 285/362 |
| 2006/0131873 | A1 * | 6/2006 | Klingbail ............ F16L 27/0812 285/147.1 |
| 2013/0000747 | A1 | 1/2013 | Buresi et al. |
| 2013/0019447 | A1 * | 1/2013 | Fitch ..................... F16L 17/10 29/428 |
| 2016/0061358 | A1 * | 3/2016 | Chu ........................ F16K 15/20 137/231 |

FOREIGN PATENT DOCUMENTS

EP 0 432 013 6/1991
EP 2 058 573 5/2009

* cited by examiner

*Primary Examiner* — David Bochna
*Assistant Examiner* — James A Linford
(74) *Attorney, Agent, or Firm* — Nixon & Vanderhye P.C.

(57) ABSTRACT

A pipe assembly includes two pipes connected together by a joining device and a drainage system, the drainage system includes a drainage slot created in the joining device, two annular seals arranged on either side of the drainage slot over the entire periphery around a pipe, and a drainage element configured to send fluid present in the drainage slot from a first end entering the drainage slot to the other end of said drainage element.

6 Claims, 2 Drawing Sheets

PIPE ASSEMBLY COMPRISING A DRAINING SYSTEM

This application claims priority to French patent application FR1462883 filed Dec. 19, 2014, the entire content of each of which is incorporated by reference.

BACKGROUND OF THE INVENTION

The present invention relates to a pipe assembly provided with a drainage system.

Conventionally, the pipe assembly comprises two pipes, and a joining device configured to connect the two pipes together.

Although not exclusively, the present invention relates more particularly to the transfer of fuel on an aircraft, in particular on a transport plane, for example in order to send fuel from a wing of the aircraft to an underwing engine attachment pylon, in order to supply the engine with fuel.

DESCRIPTION OF THE PRIOR ART

It is known that, in order to monitor possible leaks, such a pipe assembly comprising a connection of fuel transfer pipes (or lines) must be drained in specific zones.

Generally, drained connections comprise a complex and relatively bulky assembly of elements and seals.

SUMMARY OF THE INVENTION

The object of the present invention is to provide an efficient and more compact drainage system.

It relates to a pipe assembly comprising two pipes and a joining device configured to connect the two pipes together, said pipe assembly being provided with a drainage system.

According to the invention, the drainage system comprises:
- at least one drainage slot, said drainage slot being created in the joining device;
- two annular seals arranged on either side of the drainage slot, said annular seals being arranged over the entire periphery around a pipe; and
- a hollow and elongate drainage element, of which a first end enters the drainage slot, said drainage element being configured to send fluid present in the drainage slot from the first end to the other end of said drainage element.

Thus, by virtue of the invention, the pipe assembly comprises a drainage system by means of which it is possible to drain the joining device joining the two pipes, this drainage system being more compact and being particularly effective, as set out hereinbelow, being installed where the pipes meet (and are therefore weaker).

The pipe assembly may have at least some of the following special features, considered individually or in combination:
- said annular seals are O-rings;
- the drainage element is provided with a hollow cylinder, a first end of said hollow cylinder entering the drainage slot and the second end of said hollow cylinder being connected to a flexible line.

In one particular embodiment, the joining device has a general shape which is longitudinal with respect to the longitudinal axis of at least one section of each of the two pipes, and the two annular seals have one and the same diameter and they are arranged parallel to one another, coaxial with the longitudinal axis, being spaced apart longitudinally from one another.

In this particular embodiment, advantageously:
- the joining device is secured to one of said pipes, and it covers the other pipe at an end section of the latter; and/or
- the drainage slot and grooves to accommodate the annular seals are created in the outer periphery of said end section, in the form of annular grooves coaxial with the longitudinal axis.

Furthermore, the present invention also relates to an aircraft, in particular a transport plane, which comprises at least one pipe assembly such as that mentioned above.

BRIEF DESCRIPTION OF THE DRAWINGS

The attached figures will make it easy to understand how the invention may be embodied. In these figures identical references denote elements that are similar.

DESCRIPTION OF THE PREFERRED EMBODIMENTS

Figure 1:
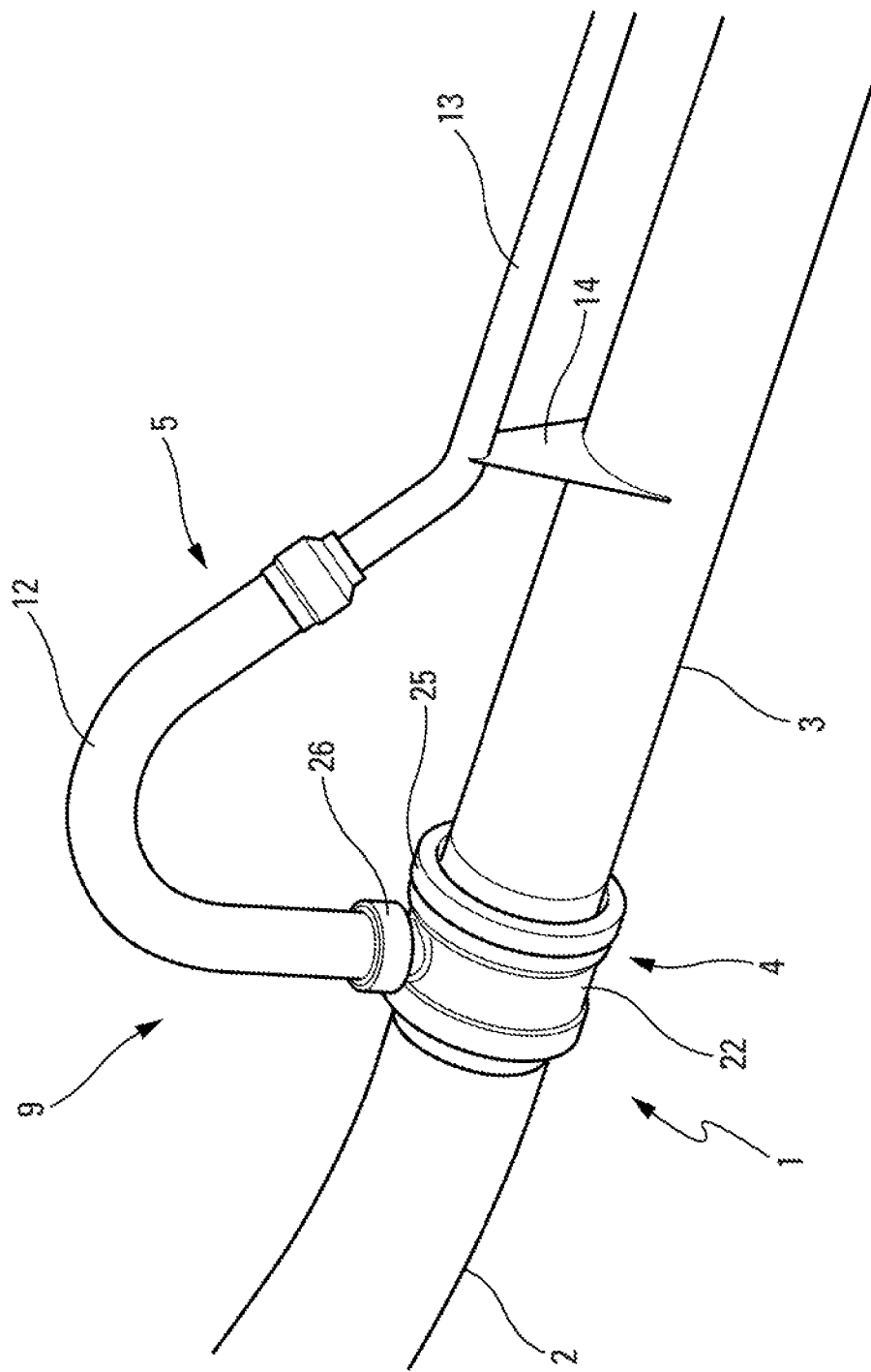
FIG. 1 is a schematic perspective view of a pipe assembly comprising a drainage system.
Figure 2:
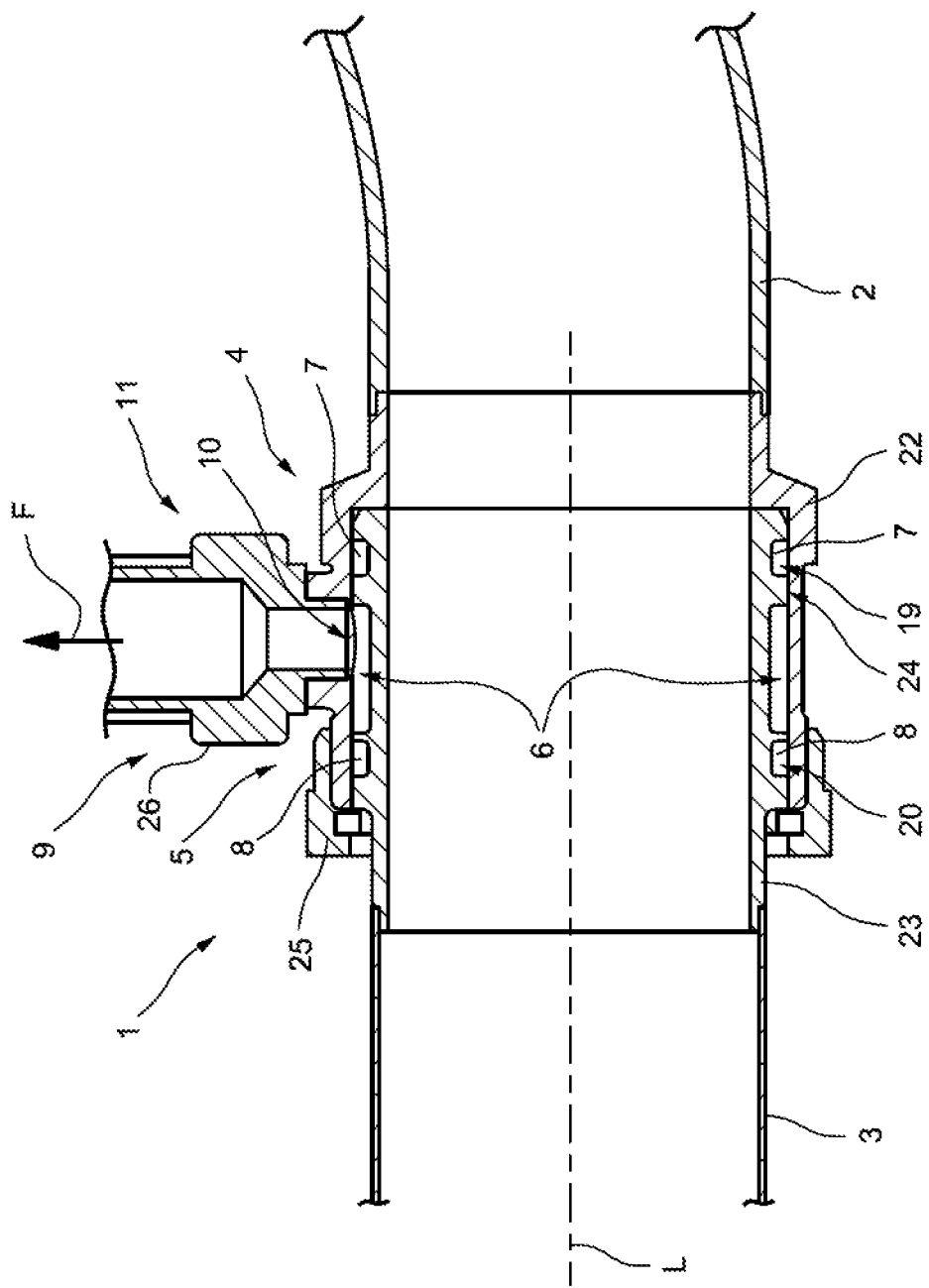
FIG. 2 is a schematic view in longitudinal section of the pipe assembly of FIG. 1.

The pipe assembly 1 shown in FIGS. 1 and 2, is a fluid transport device designed to send fluid and in particular fuel, in particular on an aircraft (not shown), in particular on a transport plane.

In a preferred application, the pipe assembly may be designed more particularly to send fuel from a wing of an aircraft to an underwing engine attachment pylon, in order to supply the engine with fuel. The pipe assembly may then be located between the primary structure of the attachment pylon and the wing, and it may provide the connection between a fuel line (or conduit) of the wing and a fuel line (or conduit) of the pylon.

As shown in FIGS. 1 and 2, the pipe assembly 1 comprises, as is conventional, two pipes 2 and 3 and a joining device 4 which is configured to connect the two pipes 2 and 3 together. Moreover, the pipe assembly 1 is provided with a drainage system 5.

According to the invention, the drainage system 5 comprises:
- at least one drainage (or collection) slot (or groove) 6. The drainage slot 6 is created in the joining device 4, as set out hereinbelow;
- two annular seals 7 and 8. These annular seals 7 and 8 are arranged on either side of the drainage slot 6. Moreover, these annular seals 7 and 8 are arranged over the entire periphery around a pipe; and
- a hollow and elongate drainage element 9, of which a first end 10 enters the drainage slot 6.

The drainage element 9 is configured to send fluid present in the drainage slot 6 from its first end 10 to its other end (not shown), as indicated by a respective arrow F in FIG. 2.

Thus, by virtue of the invention, the pipe assembly 1 comprises a particularly effective drainage system 5, which is installed on the joining device 4, that is to say where the two pipes 2 and 3 meet (and are therefore weaker). This drainage system 5 makes it possible to drain the device 4 joining the two pipes and to identify (and locate) leaks.

In one preferred embodiment, the joining device 4 is made of the same material as pipes 2 and 3 (generally entirely made of metal).

In addition, preferably, said annular seals 7 and 8 are O-rings.

Moreover, the drainage element 9 is provided with a hollow cylinder 11. A first end of the hollow cylinder 11 enters the drainage slot 6 and the second end is connected to a flexible line 12. Moreover, a rigid line 13 may be connected to this flexible line 12 so as to evacuate the drained fluid in the direction indicated by the arrow F. This rigid line 13 may in particular be attached by means of one or more attachment plates 14 to a pipe 3.

In the embodiment shown in FIGS. 1 and 2, the joining device 4 has a general shape which is longitudinal along a longitudinal axis L. This longitudinal axis L is the longitudinal axis of at least one section of the two pipes 2 and 3, as shown in FIG. 2.

The two annular seals 7 and 8 have the same diameter and they are arranged parallel to one another, coaxial with the longitudinal axis L, being spaced apart longitudinally from one another and being provided on either side of the drainage slot 6.

In this embodiment:
the joining device 4 is secured to the pipe 2 on an end section 22, this assembly being created in a single block; and
it covers the pipe 3 at an end section 23 of the latter.

The drainage slot 6, as well as grooves 19 and 20 for accommodating the annular seals 7 and 8, are created in the outer periphery 24 of said end section 23, in the form of annular grooves which are coaxial with the longitudinal axis L.

The pipe assembly further comprises a conventional retaining ring 25, which attaches the section 22 to the section 23. The drainage element 9 comprises, also, a connection element 26 to which is connected the flexible line 12, and which is attached to the section 22.

This embodiment, in which the joining device 4 is arranged longitudinally and comprises a covering for pipe end sections, is more compact as it is not necessary to attach together portions around the pipes. This embodiment may thus be easily mounted in any area, in particular of an aircraft, in which space is reduced, and may in particular be designed for the abovementioned application between a wing and a pylon, to supply an engine with fuel.

The drainage system 5 uses a double-wall system, formed by two annular seals 7 and 8, in order to guide the liquid in the drainage slot 6 to the drainage element 9. The two walls are created by the annular seals 7 and 8, which are preferably O-rings and which are arranged over the entire perimeter of the pipe, while the drainage element 9 is in one location.

Thus, whatever the weaker region in question, the first annular seal 7 prevents the drained liquid entering the pipes, and the second annular seal 8 prevents liquid present in the drainage slot 6 from reaching the outside of the pipes.

It is to be noted that, in the pipe assembly 1, it is not necessary for the two joints 7 and 8 to be arranged in the same plane, and preferably downstream of the drainage slot 6, since the joining device 4 is arranged longitudinally, in the axis L of the pipe assembly 1.

The inner cylindrical section 23 has an outer surface formed by a first outer cylindrical surface that extends from a terminal end of the inner cylindrical section and a second outer cylindrical surface that extends from an opposite end of the inner cylindrical section. The first outer cylindrical surface includes the drainage slot 6, which is longitudinally aligned with the two annular seals 7, 8. The outer cylindrical section 22 overlaps the entirety of the first outer cylindrical surface, such that the drainage slot 6 and annular seals 7, 8 are overlapped by the outer cylindrical section 22. The second outer cylindrical surface is not overlapped by the outer cylindrical section 22. The first outer cylindrical surface has a diameter along its length which is entirely greater than the diameter along the entire length of the second outer cylindrical surface. The diameter of the first outer cylindrical surface is not changed by grooves formed in the surface such as for the drainage slot 6 and the annular seals 7, 8.

The invention claimed is:

1. A pipe assembly comprising:
two pipes;
a joining device configured to connect the two pipes together, wherein the joining device has an inner cylindrical section forming an end of one of the two pipes and an outer cylindrical section forming an end of the other of the two pipes and wherein the outer cylindrical section overlaps the inner cylindrical section, and;
a drainage system comprising:
a drainage slot formed as an annular recess in a first outer cylindrical surface of the inner cylindrical section of the joining device, wherein a cylindrical wall of the inner cylindrical section entirely separates and isolates, along a radial direction, the drainage slot from an internal flow passage through the inner cylindrical section, wherein the joining device has a general shape which is longitudinal with respect to a longitudinal axis of at least one section of each of the two pipes, and the joining device defines a flow passage to allow flow to pass through the joining device and between the two pipes;
two annular seals arranged on either side of the drainage slot, said annular seals each extending entirely around the first outer cylindrical surface and are between the inner cylindrical section and the outer cylindrical section, wherein the two annular seals having a common diameter, are parallel to one another, are coaxial with the longitudinal axis, and are spaced apart longitudinally by the drainage slot;
annular grooves in at least one of the inner cylindrical section and the outer cylindrical section, wherein each of the annular grooves receives one of the two annular seals; and
a hollow and elongate drainage element attached to the outer cylindrical section, wherein the hollow and elongate drainage element has a first end facing and open to the drainage slot, wherein fluid present in the drainage slot flows into the first end and through the hollow and elongate drainage element to an opposite end of the hollow and elongate drainage element,
wherein the first outer cylindrical surface extends from a first end of the inner cylindrical section and is entirely overlapped by the outer cylindrical section, and the first outer cylindrical surface includes the drainage slot which is longitudinally aligned with the two annular seals;
wherein a second outer cylindrical surface of the inner cylindrical section is not overlapped by the outer cylindrical section and extends from the first outer cylindrical surface to a second end of the inner cylindrical section;
wherein the first outer cylindrical surface has a diameter entirely greater than the entire diameter of the second outer cylindrical surface, and wherein the first end is a terminal end of the inner cylindrical section.

2. The assembly as claimed in claim 1, wherein said two annular seals are each O-rings.

3. The assembly as claimed in claim 1, wherein the hollow and elongate drainage element includes a hollow cylinder, a first end of said hollow cylinder connected to the outer cylindrical section and facing the drainage slot, and a second end of the hollow cylinder connectable to a flexible line.

4. A pipe assembly comprising:
   a first end section of a pipe and a second end section of another pipe, wherein the first end section is inserted in and coaxial with the second end section;
   a joining device securing together the first end section and the second end section, and
   a drainage system comprising:
      a drainage slot formed by an annular recess in a first outer cylindrical surface of the first end section and overlapped by the second end section, wherein a cylindrical wall of the inner cylindrical section entirely separates and isolates, along a radial direction, the a drainage slot from an internal flow passage through the first end section, and the joining device defines a flow passage to allow flow to pass through the joining device and between the two pipes;
      annular seals seated in annular grooves in the first outer cylindrical surface of the first end section and the annular seals are sandwiched between the overlapping first and second end sections, wherein one of the annular seals is offset to one side of the recess and an another annular seal is offset from an opposite side of the recess; and
      a hollow and elongate drainage element including a first open end attached to the second end section and facing the recess such that a flow path extends from the annular drainage slot and into to the first open end of the hollow and elongate drainage element, and the flow path is configured such that fluid in the annular drainage slot flows through the first open end and into the hollow and elongate drainage element;
   wherein the first outer cylindrical surface extends from a first end of the inner cylindrical section and is entirely overlapped by the outer cylindrical section, and the first outer cylindrical surface includes the drainage slot which is longitudinally aligned with the two annular seals;
   wherein a second outer cylindrical surface of the inner cylindrical section is not overlapped by the outer cylindrical surface and extends from the outer cylindrical section to a second end of the inner cylindrical section;
   wherein the first outer cylindrical surface has a diameter entirely greater than the entire diameter of the second outer cylindrical surface, and
   wherein the first end is a terminal end of the inner cylindrical section.

5. The pipe assembly of claim 4 wherein the annular seals are parallel and have axes coaxial with axes of the first and second ends.

6. The pipe assembly of claim 4 wherein the drainage system includes an annular retaining ring coupling together the first and second end sections.

* * * * *